March 26, 1935. C. T. HENDERSON 1,995,639
PROCESS OF ANTISEPTICIZING WATER
Filed Aug. 17, 1932 3 Sheets-Sheet 1
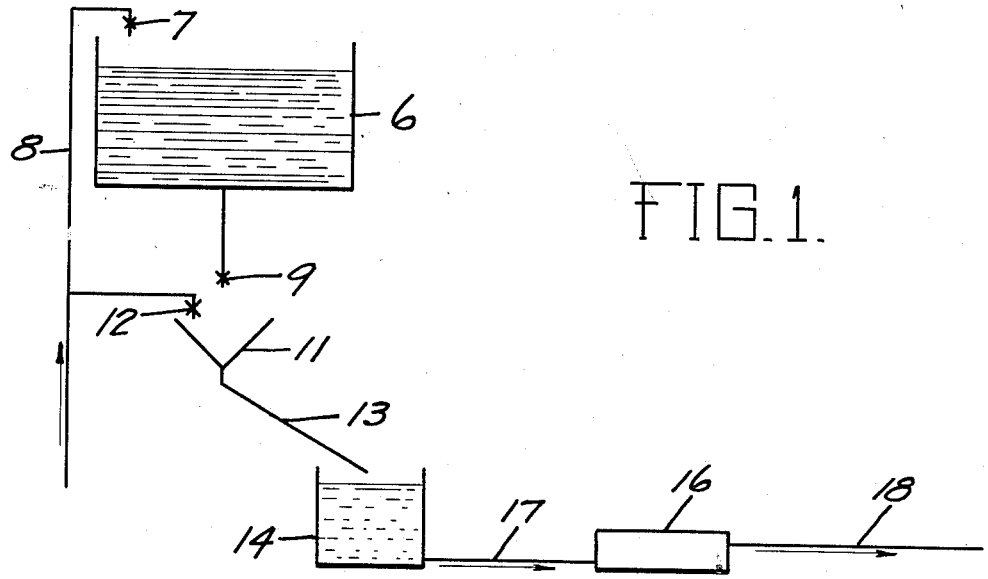
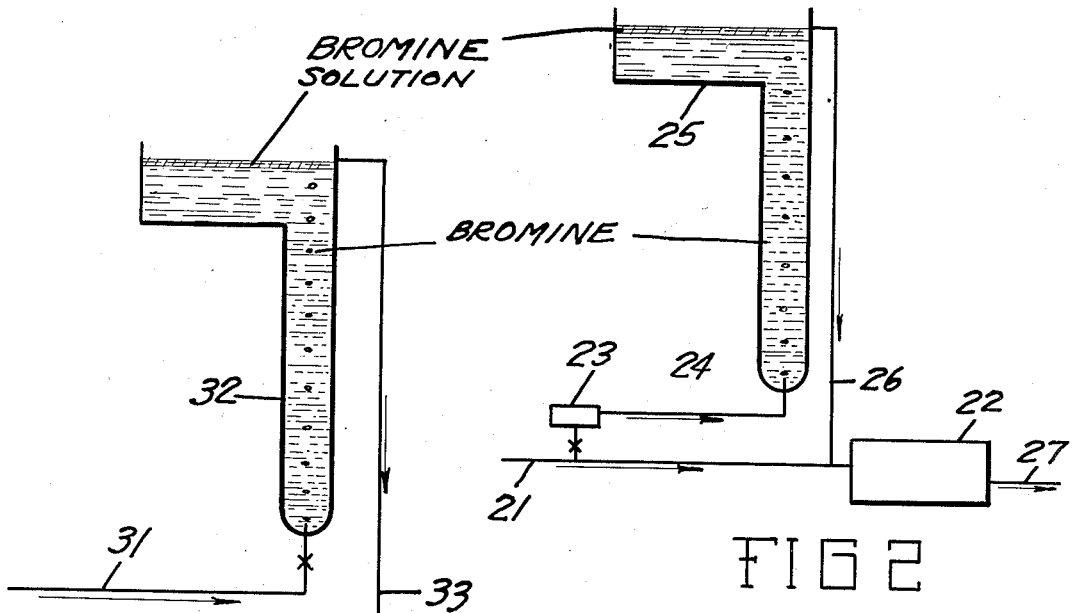
INVENTOR
CLARK T. HENDERSON
BY
ATTORNEY March 26, 1935.  C. T. HENDERSON  1,995,639
PROCESS OF ANTISEPTICIZING WATER
Filed Aug. 17, 1932   3 Sheets-Sheet 2
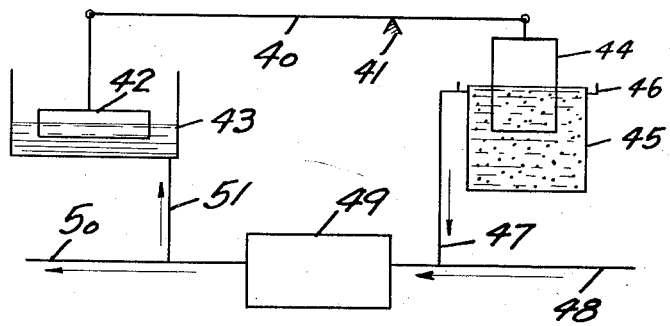
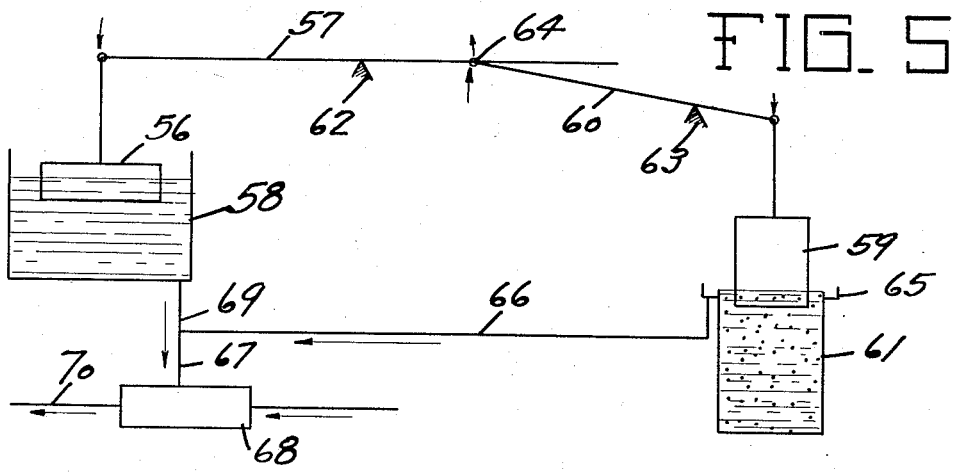
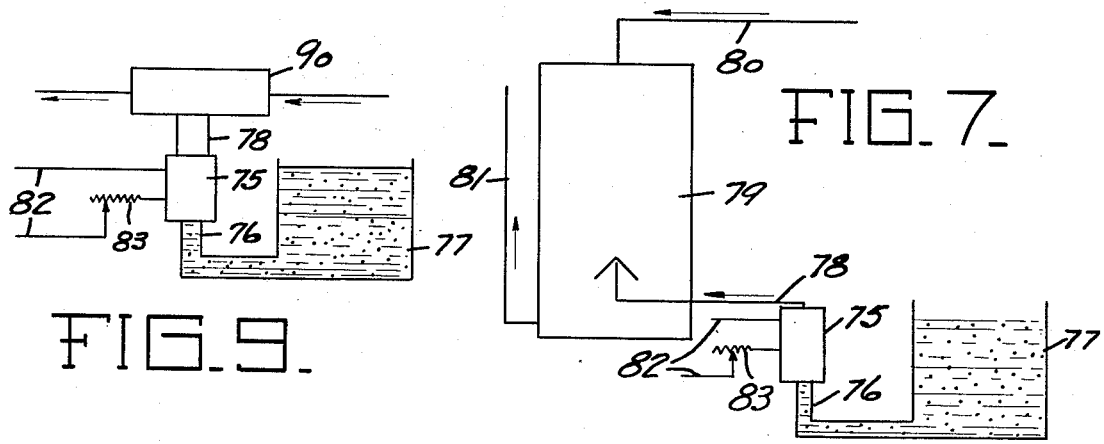
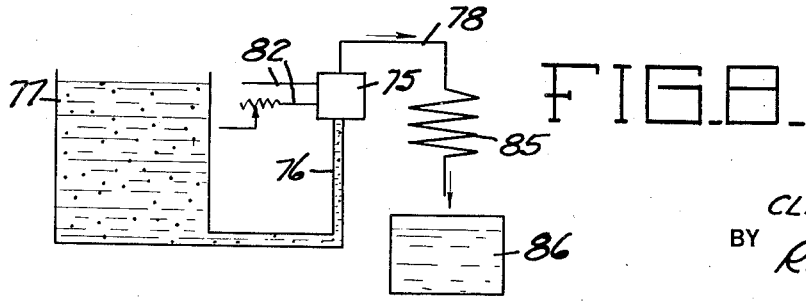
INVENTOR
CLARK T. HENDERSON.
BY Robert H. Eckhoff
ATTORNEY March 26, 1935.  C. T. HENDERSON  1,995,639
PROCESS OF ANTISEPTICIZING WATER
Filed Aug. 17, 1932   3 Sheets-Sheet 3
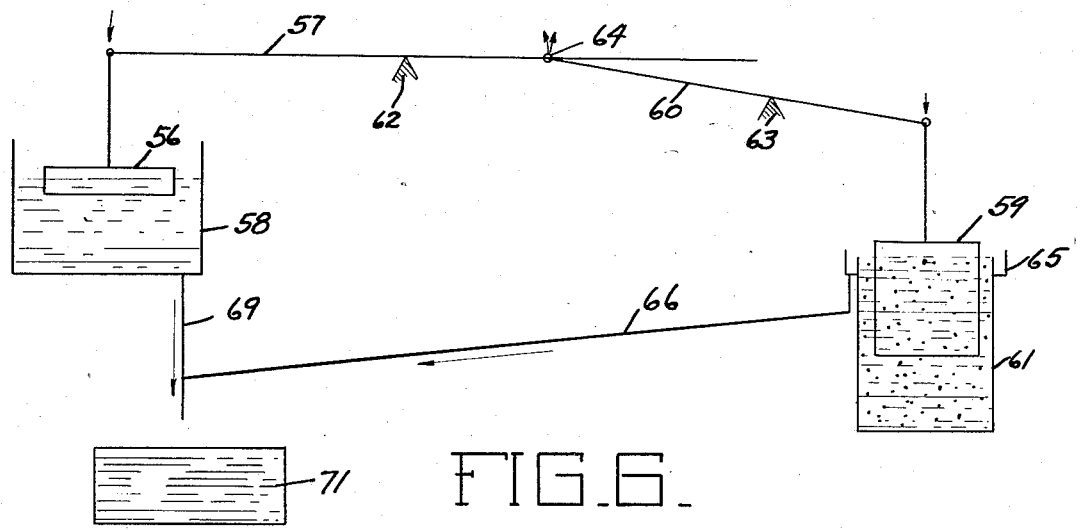
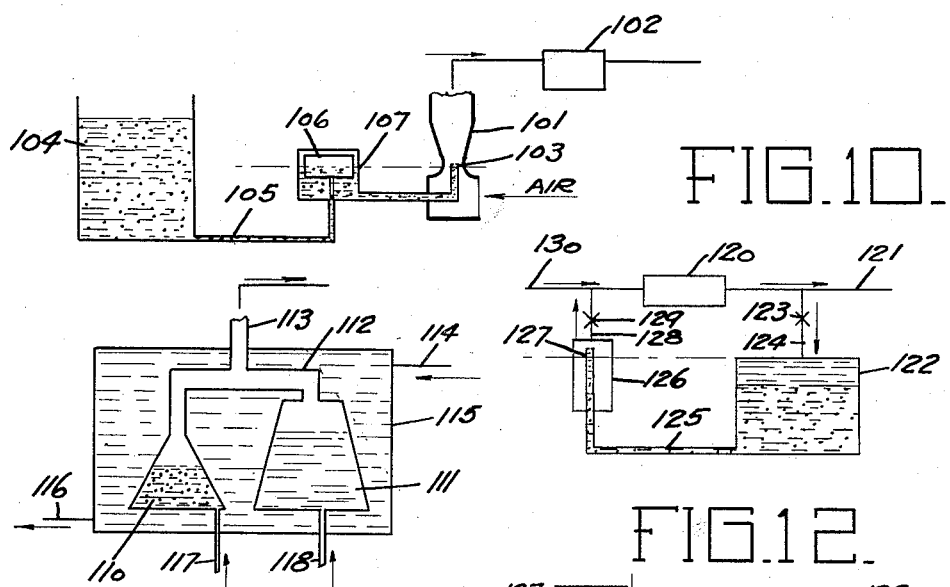
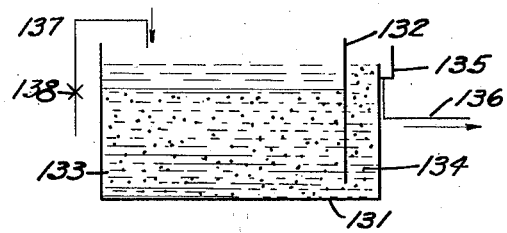
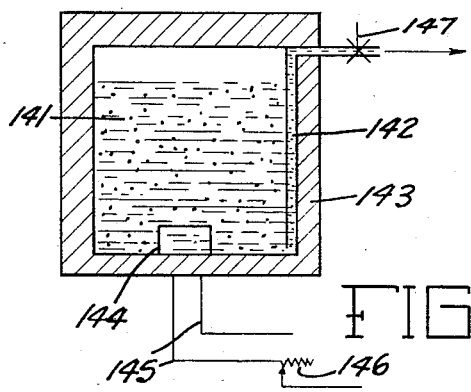
INVENTOR
CLARK T. HENDERSON
BY
Robert N. Eckhoff
ATTORNEY Patented Mar. 26, 1935

1,995,639

UNITED STATES PATENT OFFICE 1,995,639

PROCESS OF ANTISEPTICIZING WATER

Clark T. Henderson, Burlingame, Calif.

Application August 17, 1932, Serial No. 629,164

4 Claims. (Cl. 210—9)

This invention relates to the treatment of water with bromine to destroy any pathogenic organisms that may be present.

In practising my invention I use bromine which, as is well known, is a liquid under atmospheric conditions and is soluble in water to the extent of approximately 35,000 parts per million parts of water. I introduce the bromine into the water, as a solution in water and distribute the bromine solution in the water to be antisepticized so that all portions of the water are treated. The quantity of bromine introduced is relatively small and varies in amount with the water treated but does not exceed 5 parts per million. In no case is more bromine used than the organic matter of the water will account for; I do not have an excess which will require use of debrominating means. With normal waters as little as 0.10 or 0.25 part per million, I have found, will suffice to sterilize the water as effectively as a larger quantity of chlorine.

Bromine when used for sterilizing water, has been employed mostly in conjunction with other materials, so that the action is not that of bromine alone, as by using an aqueous solution of bromine in potassium bromide, and has been used in such an amount as to require the removal of the excess by some debrominator, such as ammonia or sodium sulfite. The bromine has not been uniformly distributed. The literature references to these processes indicate that large amounts of bromine are required; 40 parts or more of bromine per million parts of water. The bromine has been regarded as less effective against pathogenic organisms, weight for weight, than chlorin.

I have, however, found that relatively small amounts of bromine in the elemental form in a dilute aqueous solution are effective in sterilizing; the effectiveness being greater than that of chlorin. Bromine is about 8 times as effective as chlorin, using equal weights. As low as 0.25 part per million of bromine is effective against rather badly contaminated water; an amount of the order of 1/2000th of that stated to be necessary by some authorities (Rideal, Trans. Epidem. Soc. 1901, vol. 20, 37). In the amounts of bromine I use, the elemental bromine will all disappear from the water because of the action of the organic matter present and there is no necessity for adding foreign chemicals or for an after treatment of any kind. In these amounts, the bromine does not appreciably affect the taste or odor of the water; the action in this respect being different from that of chlorin. For any particular water, the amount of bromine required to accomplish my results may be found by bacteriological tests, using either B. coli or B. typhosus. The count of B. coli is usually taken as a measure of sterilization. In one particular case the procedure was as follows:—

Untreated water drawn from a tap on a city water supply line was used. A cubic centimeter of a 24 hour broth culture of B. coli, previously isolated from a contaminated water, was added to a liter of the tap water. The sample so prepared was counted to determine the number of bacteria present so the sample could be used as a control. To portions of the water sample, computed amounts of the halogen were added and, thereafter, computations were made by plating and dilutions at the expiration of 5, 10, 30 and 60 minutes. Following 24 hours' incubation, the plates were counted to determine the reduction, if any. The following table summarizes some of the results on B. coli, the figures given representing percent of the B. coli present which were killed in each instance.

| Halogen | Parts of halogen per million parts of water |||||| 
|---|---|---|---|---|---|---|
| | 1/10 | 1/4 | 1/2 | 1 | 1½ | 2 |
| Chlorine | 00.0<br>00.0 | 28.6<br>13.3 | 43.0<br>34.4 | 60.0<br>46.1 | 95.3<br>99.6<br>96.0<br>96.3 | 99.3 |
| Bromine | 00.0 | 99.7<br>99.9<br>83.0 | 99.9<br>100<br>99.7 | 100 | | |

Elemental liquid bromine itself cannot be metered in any commercially available type of apparatus made of commercially available materials and I therefore regulate the amount of bromine used indirectly. One such way is to flow water into contact with bromine thereby making a solution of standard strength, measuring the flow of water prior to contact with the bromine. Another, is to keep a bromine container electrically heated and lead the vapor formed into water to form a solution. The amount of bromine vapor per minute is proportional to the heat units electrically supplied.

In a prior and copending application Serial No. 619,925, filed June 29, 1932 I have disclosed a method of treating water with small amounts of bromine wherein a measured minor amount of the water to be treated is diverted from the major body of water and is passed upwardly through a standing body of liquid bromine; the resulting dilute aqueous solution of bromine being returned to the major water body and the relative quantity of bromine added to the water under treatment being controlled by regulating the amount of water diverted through the bromine. The method of that prior application is simple and efficient in proportioning the small relative quantity of bromine required for effective sterilization of water.

In the accompanying drawings I have shown diagrammatically various additional means for treating water with bromine according to my invention.

In this showing the figures are diagrammatic flow sheets illustrating various arrangements of apparatus useful in performance of the described process.

Fig. 1 indicates diagrammatically a method of making an aqueous solution of bromine and of introducing it into water. A solution of known strength of bromine is made up in vessel 6. Water used as a solvent is added to the vessel by opening valve 7 in line 8 and admitting a known volume of water to contact with a known quantity of elemental bromine added to vessel 6, the water and bromine being mixed to ensure dissolving of the bromine. The bromine solution is drawn off through metering valve 9 and discharged into receptacle 11 where a stream of water is added from valve 12, the stream of water washing the bromine solution through line 13 into sump 14. From this sump, the water and bromine solution are drawn by pump 16 through inlet 17 for discharge under pressure into outlet 18 which leads to a main water line (not shown). The water and bromine are thoroughly intermixed by the pump and the bromine is distributed intimately and uniformly throughout the water.

In Fig. 2 a modification of the method of my prior application is shown diagrammatically. As appears in this figure, water from inlet 21 of pump 22 is diverted by regulator 23 through line 24 into a bromine containing vessel 25. The vessel includes a column through which the water rises to dissolve bromine and form a bromine solution which is drawn off and introduced into the inlet of pump 22 through line 26. The stream of water is regulated and the quantity of bromine dissolved thereby controlled so that the stream of water discharged by pump 22 into outlet 27 is subject to addition of a small, uniform bromine content.

In Figure 3, a stream of water acting as a bromine solvent is introduced into bromine vessel 32 through line 31. The water dissolves bromine and forms a solution which is removed through line 33 and discharged into a body of water 34, as a swimming tank. The flow of solvent water and the effectiveness of contact with the bromine can be regulated to control the quantity of bromine introduced and liberated into the water to be treated.

In Figure 4 I have shown another apparatus and manner of making up a bromine solution. A lever 40 is positioned on adjustable pivot 41. A float 42 is hinged at one end of lever 40 to rise with the water level in container 43 while another float 44 is hinged at the other end of lever 40 and extends into a bromine container 45. A collecting trough 46 extends about the periphery of the bromine container 45 and is connected by pipe 47 to suction line 48 of an ejector or pump 49. The discharge pipe 50 of pump 49 is connected by line 51 to container 43.

In operation, a flow of water is diverted from pipe line 50 into container 43. As the water level in container 43 rises, float 44 is depressed and, as a consequence, bromine overflows into the trough 46 from which it passes by pipe 47 to be intermixed with the water in suction line 48. The bromine water solution formed in line 48 can be discharged into a body of water to be treated. By varying the position of pivot 41 and the inflow of water to container 43, the quantity of bromine expelled can be varied to suit the water undergoing treatment.

In the modified method shown in Figure 5, a float 56 is hinged on the end of a lever 57 and falls with the level of water in a container 58. Another float 59 is hinged on the end of lever 60 and extends into a bromine container 61. The levers 57 and 60 are respectively supported by pivots 62 and 63 while the levers are joined together by a connection 64 permitting lever 60 to slide on lever 57.

A collecting trough 65 is placed about the periphery of bromine container 61 and is connected by line 66 to the suction line 67 of pump or ejector 68. The water container 58 is also connected to the suction line 67 by pipe 69.

Water is withdrawn from container 58 upon the operation of the pump or ejector and float 56 falls. Through the connected levers, float 59 is forced downwardly in the bromine container to eject bromine which is transferred and intermixed with the stream leaving the pump or ejector through discharge 70.

Instead of using a pump or ejector, the bromine discharged can be piped directly to a body of water, the water discharged through line 69 being added thereto, as appears in Figure 6. As is there shown, bromine is conducted through line 66 and discharged into a body of water 71, the water stream from container 58 being added thereto. This provides a simple apparatus for making a bromine solution and one which can be controlled and varied by control of the quantity of water discharged through line 69 and by varying operation of levers 57 and 60 about pivots 62 and 63.

In Figure 7 I have shown another successful form of apparatus wherein bromine is vaporized by heating means 75 and is added to water to be treated. Bromine for vaporization is supplied to a conduit 76 from a bromine container 77 having a relatively great area so that much bromine is confined for each unit of depth. The bromine in conduit 76 is heated, same being vaporized and then discharged through line 78 into an absorption plate column or packed tower 79. Water is discharged from line 80 into the tower wherein it dissolves the bromine, the water and bromine being intimately contacted by the plates or packing in the tower. After dissolving the bromine, the water passes out of the tower through line 81. The water stream can be a flow less than that of the main flow to be treated or can be only a small flow sufficient to conduct the bromine to a body of water as a swimming pool.

Vaporization of bromine by the heating means is controlled so that bromine vapor emission is of a desired volume. Thus the heating means can be a resistance coil heated upon current being supplied through line 82 to maintain bromine in a portion of conduit 76 thermostatically at a temperature in accordance with the bromine to be vaporized. A resistance 83 is included to permit regulation of the temperature attained by the heating coil so that the volume of bromine vaporized can be controlled.

In Figure 8 I have shown a modification wherein bromine vapor emitted through line 78 is passed through a condenser coil 85. The vaporized bromine condenses and discharges into the body or stream of water 86. Since the vaporization of bromine can be controlled with ease and accuracy, this is a simple way of adding bromine to water.

In Figure 9 I have shown another modification wherein bromine vaporized in a section of line 76 is withdrawn therefrom by an aspirator or pump 90. By controlling the vaporization of bromine and the suction of the pump, bromine vapor removal can be accurately controlled as can the bromine added to the discharge of aspirator.

In Figure 10 is shown a simple form of apparatus wherein the bromine, or bromine in solution, is evaporated in a simple carburetor 101. An aspirator or pump 102 is utilized to draw air through the carburetor so that bromine is discharged through jet 103 into the air stream passing through the carburetor. Bromine is supplied to the jet from a supply tank 104 through a line 105, a float valve mechanism 106 maintaining a constant head of bromine on jet 103 from intermediate chamber 107.

In Figure 11 I have disclosed an apparatus utilizing the partial pressure and rate of evaporation of bromine and another liquid to control bromine addition. Vessel 110 is provided for bromine and vessel 111 for other liquid, which can be water. The vapor spaces of these vessels are connected by conduit 112 to each other and to conduit 113 which extends to a pump suction. The composition of the vapor drawn off through conduit 113 consists of bromine and water, the percentage of each depending on the temperature and the facility with which the bromine or water is permitted to evaporate and the rate of evaporation of the bromine and water.

The temperature is maintained practically constant by passing water through inlet 114 into water jacket 115 and out through outlet 116 since the water undergoing treatment is usually of a constant temperature. Of course other means can be used to secure the uniform temperature.

The vessels 110 and 111 are of such a contour that a change in depth is accompanied by a change in exposed surface from which evaporation can take place. In the form shown, truncated cones, a lowering in the level increases the area and, also, the volume into which evaporation can take place. By controlling the level of the liquid in each container, at a given temperature, the rate of evaporation is controlled by varying the free liquid surface, and thereby the partial pressure of the bromine or water vapor in the gas drawn off through conduit 113. The liquid level in each container is controlled by regulating the liquid passed through the respective inlets 117 and 118 for vessels 110 and 111.

While bromine has a higher vapor pressure than water, the rate of evaporation of bromine is lowered by decreasing the free surface thereof to the end that the vapor removed contains less bromine than it would if the evaporation of water was not facilitated and that of bromine hindered.

In Figure 12 a stream of water under pressure from a pump 120 is diverted from pump outlet 121 into a large bromine pressure container 122 through valve 123 and pipe 124. Bromine under pressure is forced through pipe 125 to be vaporized in chamber 126 by jet 127. Bromine vapor is withdrawn through pipe 128 and valve 129 into suction line 130 of the pump 120.

Winkler (Chem. Zeit. 1899, 23,687) says that bromine liquid is insoluble in water but that bromine vapor is soluble and dissolves according to Henry's law. The vaporization of bromine therefore facilitates its incorporation in the water while the large size of container 122 enables a fairly large stream of water to be diverted through pipe 124 to secure a relatively minute flow of bromine for vaporization.

This use of a large flow of water to displace a much smaller bromine quantity is also shown in Figure 13. Container 131 is divided by baffle 132 into a large bromine storage and water receiving portion 133 and a much smaller bromine discharge portion 134. Bromine is removed by discharge weir 135 and pipe 136.

Water is discharged into portion 133 from pipe 137 under the control of valve 138. Since the water discharged from pipe 137 can be a very small quantity, the quantity of bromine discharged is much smaller in the ratio of the area of portion 133 to portion 134. Since this ratio can readily be as large as 1000 to 1 the control of bromine discharged is a simple matter.

In Figure 14 another apparatus is disclosed wherein a large bromine container 141 is provided with a small outlet 142, the container and outlet being covered with heat insulating material 143. A heating unit 144 as an electrical resistance is placed to heat the bromine in the container, current being supplied through lines 145 and controlled by a thermostat in the unit and adjustable resistance 146. The heating unit, when desired, maintains bromine in the container at some predetermined temperature. As a consequence a definite and regulatable pressure exists in the vapor space above the bromine in container 141. This pressure is exerted through the liquid bromine on the discharge valve 147 so that the bromine passing the orifice provided by the valve is subject to two controls, one through variation in pressure in container 141 by changing the temperature and the other by varying the orifice provided by valve 147. An accurate control is thus provided.

It is a feature of my invention that a subsequent treatment to remove the bromine added to water is not necessary. This clearly distinguishes the treatment of water which I effect from previous practices wherein a residue of free bromine remained and was combined, by a distinct treatment, into some compound. The quantity of bromine used is so minute that within a few hours at most all excess bromine combines or reacts with impurities in the water, usually organic matter, and a residue of elemental bromine is thus obviated, the bromine appearing as an equivalent amount of combined bromine, usually bromide. The rapidity with which the elemental bromine disappears depends on the character of the water and effectiveness of contact of the water and bromine. On ordinary waters I have been unable to detect free bromine half an hour after addition of the bromine in quantities employed in accordance with my invention although the water was satisfactorily antisepticized.

The invention is applicable to the treatment of all sorts of waters which are benefited by the use of bromine, and the term "water" in the claims is to be understood as including all kinds of water and watery liquids, such as the water of city and town supplies, sewage, etc. The proportionate amount of bromine to be aded to the water to be treated will, as I have indicated above, be determined according to the water. Waters requiring much more than five parts of bromine per million usually contain some material or materials reacting with the bromine and the bromine is used up, not in sterilizing the water, but in the reaction with this material. A preliminary treatment, such as filtration, to remove this material may be of advantage and reduce the quantity of bromine required to effect sterilization. Ordinary waters are usually sterilized by as little as a tenth part of bromine per million parts of water and about five parts of bromine per million parts of water is a maximum. Taking advantage of the small solubility of bromine in water, regulation of a small ratio of bromine to the water to be antisepticized is simply and readily effected, as described, by regulation of the volume of water used as a solvent with relation to the volume of water to be treated.

This is a continuation in part of my application 619,925 filed June 29, 1932.

I claim:

1. In sterilizing water, the process which comprises adding an aqueous solution of elemental bromine, free from foreign bodies and of known bromine content, to such water, the quantity of the solution added being such that all the free bromine will completely disappear without a residue of bromine requiring the use of a debrominator; the amount of bromine so added being not greater than 5 parts per million of water to be treated.

2. In the process of claim 1, vaporizing liquid bromine by heat applied thereto, absorbing the bromine vapor in water and adding the resulting bromine solution to the water to be sterilized.

3. In the process of claim 1, regulating the proportion of bromine added to the water to be sterilized by applying a metered supply of heat to a vessel containing liquid bromine so as to vaporize the bromine, absorbing the bromine vapor in water to form the bromine solution for addition to the water to be sterilized and varying the metered supply of heat to vary the rate of bromine dosage.

4. A method of sterilizing water which comprises adding thereto with substantially uniform distribution therein an aqueous solution of bromine in a concentration corresponding to the solubility of bromine in water alone under atmospheric conditions and in relative quantity such that the ratio of bromine to the sterilized water is not greater than 5 parts per million.

CLARK T. HENDERSON.